(12) United States Patent
Slonh (10) Patent No.: US 8,751,602 B1
(45) Date of Patent: Jun. 10, 2014

(54) METHOD AND APPARATUS OF PROVIDING NOTIFICATION SERVICES TO SMARTPHONE DEVICES

(75) Inventor: Sarith Slonh, Irvington, AL (US)

(73) Assignee: West Corporation, Omaha, NE (US)

( * ) Notice: Subject to any disclaimer, the term of this patent is extended or adjusted under 35 U.S.C. 154(b) by 112 days.

(21) Appl. No.: 13/232,372

(22) Filed: Sep. 14, 2011

(51) Int. Cl.
*G06F 15/16* (2006.01)

(52) U.S. Cl.
USPC .......................................... 709/217; 709/204

(58) Field of Classification Search
None
See application file for complete search history.

(56) References Cited

U.S. PATENT DOCUMENTS

| | | | |
|---|---|---|---|
| 7,366,528 B1 * | 4/2008 | Mikan | 455/466 |
| 2009/0156190 A1 * | 6/2009 | Fisher | 455/418 |
| 2010/0004007 A1 * | 1/2010 | Vogel et al. | 455/466 |
| 2010/0047745 A1 * | 2/2010 | Bergqwist et al. | 434/127 |
| 2010/0285822 A1 * | 11/2010 | Carney, II | 455/466 |
| 2011/0098156 A1 * | 4/2011 | Ng et al. | 482/8 |
| 2011/0153398 A1 * | 6/2011 | Tjhai et al. | 705/14.14 |
| 2012/0084286 A1 * | 4/2012 | Hubner et al. | 707/737 |

* cited by examiner

*Primary Examiner* — Ario Etienne
*Assistant Examiner* — Clayton R Williams (57) ABSTRACT

A method and apparatus of providing notifications to a mobile station user is disclosed. The method may include receiving a user registration for a notification application and storing the user registration information in a notification database. The method may also include receiving a business entity designation from the mobile station identifying at least one business entity from which the user desires to receive notifications. The method may also include transmitting a notification to the mobile station in response to the business entity designation.

20 Claims, 7 Drawing Sheets

METHOD AND APPARATUS OF PROVIDING NOTIFICATION SERVICES TO SMARTPHONE DEVICES

TECHNICAL FIELD OF THE INVENTION

This invention relates to a method and apparatus of providing notification services to smartphones and related subscriber devices, and in particular, to providing push notification reminders to the subscribers associated with any type of service organization.

BACKGROUND OF THE INVENTION

Consumers seek to maximize the use of their time. Electronic devices such as smartphones, personal digital assistants (PDAs) mobile telephones, tablet devices, laptops and other Internet connectivity devices ("mobile stations") provide users with mobile access to various information resources. Such mobile stations generally operate via a cellular 3G or 4G broadband data communication standard and/or a WIFI network connection to a local area network.

Digital data services, such as voice services and mobile data services, provide user data services and applications to the end user. For example, calendar services and notification services provide appointment and calendar related information to mobile users on a daily basis. Also, these appointment services may offer advanced data services, such as synchronization and feedback services with remote organizations affiliated with the mobile user (e.g., doctor's office scheduling, workplace scheduling, bill payment scheduling, etc.).

Conventionally, users relied strictly on user initiated calendar applications integrated with e-mail on their mobile devices. However, users may be unfamiliar with the above-noted scheduling services and such services may require constant user updating efforts. Notification services may offer additional features to provide notifications or reminders to the user to maintain an interactive environment between the users and the associated business entities. Additionally, such scheduling services may be customized to the users' needs and preferences.

SUMMARY OF THE INVENTION

One embodiment of the present invention may include a method of providing notifications to a mobile station user, the method may include receiving a user registration for a notification application and storing the user registration information in a notification database. The method may also include receiving at least one business entity designation from the mobile station identifying at least one business entity from which the user desires to receive notifications, and transmitting at least one notification to the mobile station responsive to the at least one business entity designation.

Another example embodiment of the present invention may include an apparatus configured to provide notifications to a mobile station user. The apparatus may include a receiver configured to receive a user registration for a notification application and storing the user registration information in a notification database, and receive at least one business entity designation from the mobile station identifying at least one business entity from which the user desires to receive notifications. The apparatus may also include a transmitter configured to transmit at least one notification to the mobile station responsive to the at least one business entity designation.

DETAILED. DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
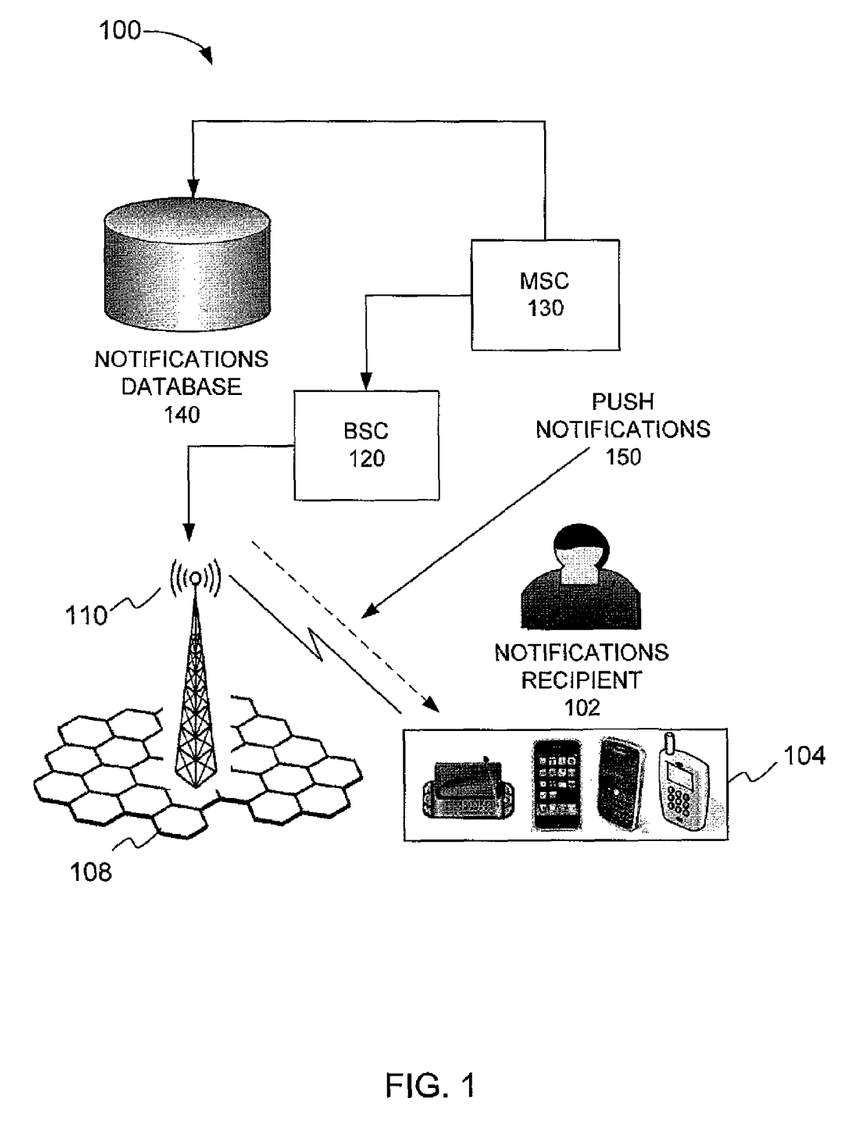
FIG. 1 illustrates an example communication network system according to example embodiments of the present invention.

FIG. 1 illustrates an example communication network system according to example embodiments of the present invention. Referring to FIG. 1, the network system 100 may include an end user or notifications recipient 102 operating a smartphone, tablet device, cell phone, or other cellular 3G/4 G communication device "mobile station" 104. Any of the mobile stations 104 may be configured to receive notifications, reminders, emails and other data services via a push protocol. The mobile station 104 may be communicating wirelessly with a communication network, such as cellular network 108 via a cellular base station 110. The cellular network communication hierarchy may further provide a base station controller (BSC) 120 in communication with a MSC 130 coupled to a notifications database 140. The mobile station 104 may be configured to initiate or receive voice calls, video calls and/or broadband data communication services.

In operation, the communication network of FIG. 1 processes notifications, which are sent to the notifications recipient 102 at the appropriate predefined time(s) stored in the notifications database 140. The notifications may be sent as a voice call 108, email 110, SMS/MMS message 112, mobile application (e.g., mobile smartphone application), a web site 116 plug-in, etc., and may be sent to the mobile station via push notifications 150 operating in accordance with a push protocol for instant delivery to the mobile station 104.

In one example, a text message may be sent as a push notification across the cellular or wireless communication network to a MSC 130, and routed to a BSC 120 and corresponding BS 110. Certain text messaging protocols may be used, such as, mobile short message service (SMS), multimedia message service (MMS), and instant messaging (IM), or any other related text application. The communication medium may include transferring information over communication links, such as wireless networks (e.g., GSM, CDMA, 3G, 4G, etc.), wireline networks (e.g., landline telephony), Internet, satellite/cable networks, or, any other data medium using standard communication protocols.

Figure 2:
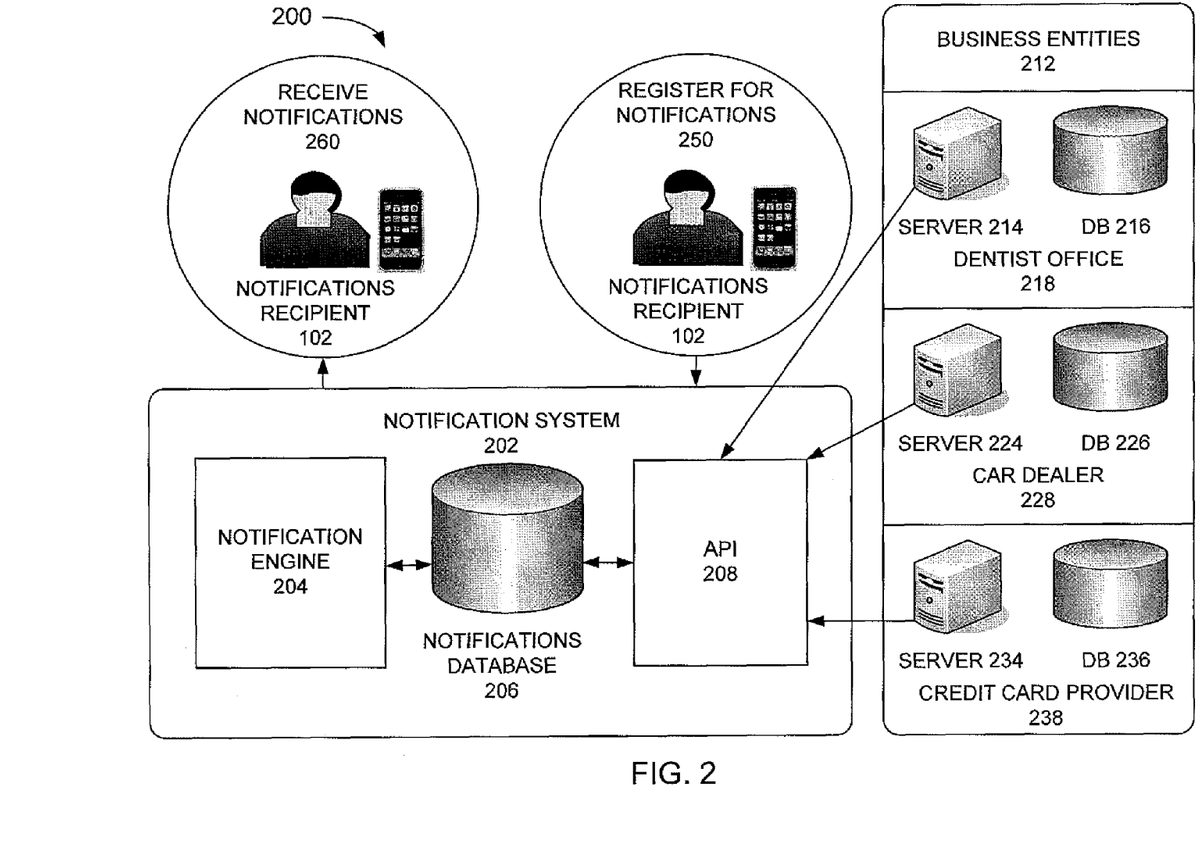
FIG. 2 illustrates an example logic diagram of a notification delivery system according to example embodiments of the present invention.

FIG. 2 illustrates an example logic diagram of a notification delivery system according to example embodiments of the present invention. Referring to FIG. 2, the notification delivery system 200 includes a central notification system 202 including a notification engine 204 configured to receive user registrations for notifications and to process those notifications based on certain triggers, such as predefined dates (e.g., scheduled appointments), elapsed time durations (e.g., time of the month to pay a bill), and other notification criteria information provided by the end user 102 and/or the business entity 212 affiliated with the end user 102.

The notifications database 206 may provide a centralized data storage of all notifications that are intended for the subscribers 102. The notifications database 206 may receive user initiated notifications and/or business entity initiated notifications that are intended to be sent to the end user 102 at predefined intervals. An application programming interface (API) 208 is provided as an application and/or website that the business entities 212 may subscribe with for the purpose of entering notification information for a particular subscriber 102.

According to one example, a user may visit the dentist office 218 and may agree to receive notifications from the dentist office by registering with an online application or in-person QR code. The dentist office may maintain a record of the user and his or her appointments in an office server 214, which maintains a record of the customer's name, telephone number, address, appointments scheduled and other information. The information may be stored in a database 216 as part of the office server 214, or as a separate entity. In operation, the end user may sign up for notification services by scanning a quick response (QR) code found on a publicly displayed poster at the provider's establishment (see poster 300 of FIG. 3), and/or by scanning a QR code found on the provider's website. Alternatively, the user may enter an alphanumeric code from a publicly displayed poster into the smartphone application and/or enter an alphanumeric code obtained from the provider via verbal or written methods.

On receiving the user submission, a web service request is made to the notification system 202 to flag the registered user 102 as a consented receiver of notifications for the business entity provider 212. The flag may be set to active and stored in the notification database 206. Alternatively, when the user desires not to receive notifications any longer, the flag may be set to inactive, but may remain in the database 206 for a certain amount of time pending the user's decision to reactivate the notifications from a particular business entity 212. Once the user registration has been setup, the user may input additional information designating at least one business entity form which the user desires to begin receiving notifications. Linking the user registration information and the business entity designation in the notification database provides a link between the notifications scheduled by the business entity, and, in turn, the notifications actually sent to the user.

Examples of the user 102 registering for notifications 250 and receiving notifications 260 are discussed in further detail below. In one example, the notification recipient (user) 102 may visit the dentist office 218 as a patient and arrive for their appointment accordingly. On the wall of the dentist office may be a poster similar to FIG. 3, where the user can scan the QR code to initiate the notification application. The patient may instead access an application store on their smartphone and download the reminder application for free. The patient may register and use the application to scan the QR code in the office directly to their smartphone via a smartphone scanning operation performed via the camera feature of the smartphone. The application may have been generated specifically for that provider, or may be generic to any provider. The patient is now registered for notification services with their dentist's office and will receive appointment reminders and other notifications via a push notification protocol.

The dentist office 218 may store the user's name, telephone number, address and appointment information in a database 216. The dentist office server 214 may synchronize the upcoming appointments with a notification system 202 by periodically interfacing with an application programming interface 208 to upload the patient appointment information to the notifications database 206. The uploaded appointment information may then utilize a notification engine 204 to trigger the appointment reminders ahead of schedule and notify the user periodically of the upcoming appointments (e.g., one week ahead of time, one day ahead of time, 5 hours ahead of time, etc.). Other information may also be passed on to the user 102 via a push notification, such as what documentation is needed during the appointment. Other pertinent information may be passed along to the user 102 via push notifications, such as selling points (e.g., "Did you know that Dr. Smith was the dentist of the year by "Healthy Gums" magazine) to encourage the user 102 to keep their scheduled appointments and follow-up for future appointments.

In another example, the notifications recipient 102 may visit a car dealer 228. After purchasing a new vehicle, the customer may be handed a sheet of paper which contains instructions similar to FIG. 3. The customer may then visit the smartphone's application store and download the reminder application for free. The customer may register and use the application to scan the QR code on the instruction page. The customer is now registered for notification services with the car dealership and will receive whatever information suggested by the car dealer, maintenance reminders, upcoming sales, and other notifications customized by the car dealer 228 via push notification. These reminders may be stored in the car dealer database 226 and forwarded to the notification system 202 via a local server 224 operating at the car dealer 228. The local server 224 may periodically send update messages to the notifications database 206 to add new notifications or to reschedule existing notifications.

In another example, according to example embodiments of the present invention, a credit card provider 238 may offer push notifications to a notifications recipient 102. A customer may be concerned with identity theft and may call the credit card provider 238 frequently to request notification each time his or her credit card is used, which creates a burden for the credit card provider 238 to maintain customer service personnel for the end user's frequent inquiries. The credit card support operator may inform the customer of a reminder application and its notification capability, which notifies the customer each time his or her credit card is used, or less often (e.g., once a week, etc.).

In order to register for the automatic reminders or notifications, the customer may be supplied with an alphanumeric code from the credit card provider 238. The customer downloads the reminder application for free from the smartphone's application store and registers their personal information. The customer inputs the code corresponding to the credit card provider 238 and is now registered for notification services with the credit card provider 238 and will receive alerts when his or her credit card is used. The credit card provider 238 may store the customer's personal information in a database 236 and upload the information to a notification system 202 via a server 234, similar to the above-noted examples. This provides the notification system 202 with the customer's personal information for notifications to be generated and sent to the recipient 102 at the appropriate times.

Figure 3:
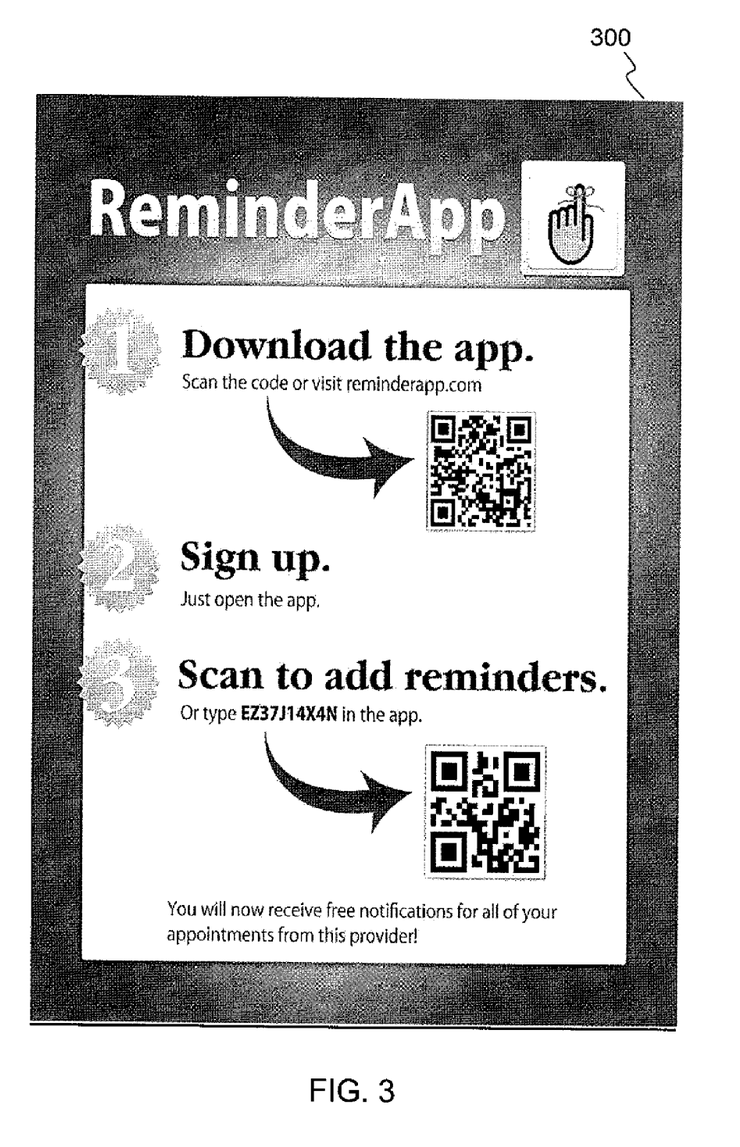
FIG. 3 illustrates an example graphical user interface used to initiate a notification service according to example embodiments of the present invention.

FIG. 3 illustrates an example graphical user interface used to initiate a notification service according to example embodiments of the present invention. Referring to FIG. 3, a "reminder app" application 300 may be accessed by a smartphone scanner interface that scans a bar code or quick response (QR) code. A QR code is a specific matrix barcode (or two-dimensional code), readable by dedicated QR barcode readers and camera features of smartphones. The QR code may include a variety of black boxes arranged in a square pattern on a white background. The information encoded in the QR barcode can be text, a website uniform resource locator (URL) or other data accessible by the smartphone. In this example, the user may download a reminder application for each of the business entities the user encounters. Or, the user may download one parent notification application and add additional business entities as they become apparent to the user.

In operation, a user may download the application or scan the QR code via the user's smartphone 104. The user may setup an account by entering email information and/or notification preferences, such as audible indicators, time frame for receiving notifications, rescheduling options, default options, links to other calendar applications and voice mail, text message preferences, etc. The user may then connect with a business entity to begin synchronizing appointment information initiated by the business entity 212 and stored in the notification database 140/206.

According to one example embodiment of the present invention, the operation of the notification system 202 may follow a particular flow of events for a business entity 212. For example, a business entity 212 (e.g., dentist office 218, car dealer 228 or credit card provider 238) may register with the notification system 202 provided by a third party notification service at a remote location. The business may provide sign-up information, name, address, billing information, etc., which will be submitted online and stored in the notifications database 206 as a new profile. The business entity 212 may be provided with an automatically generated sender identification (ID). Contracts based on usage and billing will be created at this time and associated with the sender ID.

The business entity 212 may then register notification offerings. For example, using an online web interface, the business entity 212 will enter notification offerings that may be offered to potential end user recipients 102. In order to promote the use of the application, the business entity 212 will be provided with marketing materials that includes the QR codes for quick subscription functions both in hard copy format and via an electronic online version for website notification access. Using the API 208 provided by the notification system 202, the business entity 212 will send notification data through a web service that will create new entries in the notifications database 206.

Information exchanged between the business entity 212 and the notification system 202 may include a sender ID, which is the ID of the business entity within the notifications database. Other information exchanged may include a receiver ID, which is the ID of the end user that will receive the notification. Further information may include message content, which is the message to be displayed via a push notification, and a notification ID, which is a unique ID for a particular notification, which is used in case a modification is required. Other parameters needed to create a push notification may include a "window begin" parameter designating the earliest time in a date-time format at which the notification can be sent out, a "window end" parameter, designating the latest time in a date-time format at which the notification can be sent out.

One example method of operation of the notification system 202 may include the following operations. A business entity 212, such as Dr. Smith orthodontics, may register to use the reminder application to send out appointment reminders and important information (e.g., "office closed due to weather"). Dr. Smith may contact a sales representative at the notification system provider and have his information entered into the system. He may also sign a contract paying on a per-notification basis, an unlimited notification plan, etc.

Dr. Smith may only require two basic notifications, such as appointment reminders and emergency information. Dr. Smith may log on to the reminder application web site and add these two offerings and their descriptions. As a result, Dr. Smith may receive several posters with instructions and QR codes, which can be hung up on the walls at this practice. He may also add the QR codes to his website and patient forms. Using an appointment integration application (e.g., T.Link), Dr. Smith may automate the sending of appointment reminder push notifications based on new appointments added to his push management system (PMS). On days where he is sick and won't be in the office, Dr. Smith can send individual or bulk push notifications to his patients for the day using the reminder application website or a custom interface solution utilizing the API. Such notifications may solicit a response, such as rescheduling an appointment that was cancelled at the same time of sending a notification that the appointment was cancelled.

An example flow of events for an end user notification recipient 102 may include downloading the reminder application, depending on what type of smart phone the user has, he or she can download the application free of charge from the phone's respective application market. Next, the user may register to use the application by providing personal information, name, address, e-mail, preferences, etc. The user may be asked for their first name, last name and email address. The email address is required for integration purposes and to verify the user by sending an email with a confirmation link/code. The user may then subscribe to receive push notifications from registered business entities.

In order to subscribe to notifications, the user may scan a QR code. This will submit, via a web service, the user's ID and the sender information (encoded in the QR code) to the notifications engine. The notifications engine 204 will attempt to confirm that the user exists in the sender's data via a web service. If no web service integration is set up, the notification engine 204 will submit a notice to the sender, providing the user's information. It will be up to the sender at this point to verify the user against their own records. Once the user is confirmed, an entry will be added to the notifications database 206 reflecting the user's subscription with the sender.

The user can input a code into the application to identify the business entity as a notification provider. The flow of operations for the notification engine 204 is described in detail below. The notification engine 204 receives notifications (individual or bulk) via web services that are exposed but secured for registered business entities 212, and stores them in the notification database 206 based on pre-established profiles setup for the business entity 212. A web service broker will process the requests and send them to queues based on their send window. A task service farm will work on individual queues and send out the push notifications during an open send window.

Should errors or an outage occur within the task service farm, unsent notifications still within their send window will be given high priority and re-inserted into the queues. Successful deliveries will be removed from the notifications database 206 and archived on a separate database for reporting purposes. Deliveries may be deemed successful when a confirmation is returned to the notification system 202, or via a lack of an error message being received at the notification system 202.

Figure 4A:
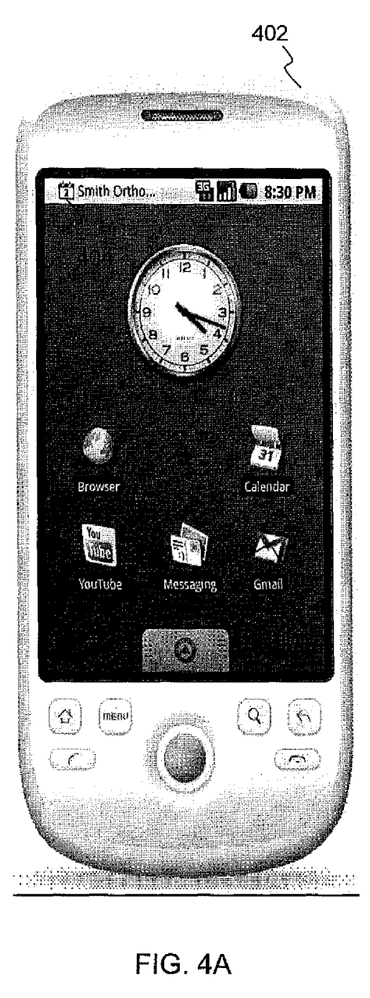
FIGS. 4A and 4B illustrate example notification applications according to an example embodiment of the present invention.
Figure 4B:
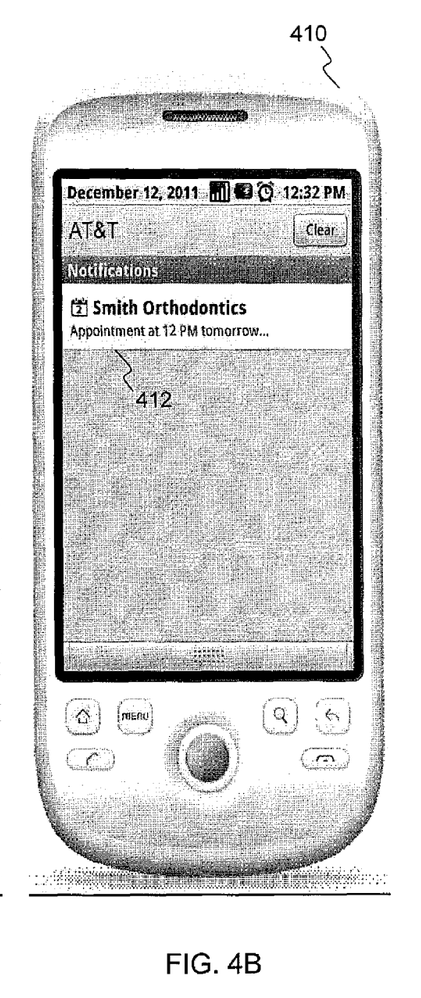

FIGS. 4A and 4B illustrate example notification applications according to an example embodiment of the present invention. Referring to FIG. 4A, the user's smartphone 402 is illustrated with a user interface including various icons, such as a browser, email service, calendar, etc. The top left corner of the user's display area indicates a notification that was sent to the user to remind the user of a particular doctor appointment 404. FIG. 4B illustrates another view of the smartphone user interface 410 demonstrating an appointment notification queue including one upcoming appointment 412.

The appointment reminder depicted on a smartphone device, such as the Android® smartphone platform in FIG. 4 is an example with the reminder application involving a patient and an orthodontist office named "Smith Orthodontics." Orthodontist offices may implement a practice management system (PMS) to maintain records of all their patients and respective appointments. Typically, a receptionist inputs information directly into the PMS using the software that was provided. In order to automate sending appointment reminders, the practice will either have to be registered with a third party provider that provides integration services (e.g., T.Link), or have their own PMS or in-house developers integrate the functionality of submitting a notification to the notification engine 204. Any business entity may desire to have notifications sent automatically based on any event, whether it be an appointment or a maintenance schedule event.

Once the notification engine 204 receives the push notification request, it is sent out during the send window time frame provided by the sender/business entity 212. The notification recipient 102 will receive a push notification, such as the examples depicted in FIGS. 4A and 4B. A notification can be modified up to the point of dispatch. Ideally, within ten minutes of the beginning of the send window, a notification may be modified. For example, if an appointment reminder notification is scheduled to have a send window between 5:00 pm and 5:10 pm today, the notification can be updated up until 4:50 pm. The functionality to update a notification will be provided in the API 208. If the message content changes and/or send time changes, the system can automatically update the notification database entry based on the updated notification information.

According to an example embodiment of the present invention, a user may perform a series of operations in order to receive and respond to push notifications. The following is a list of operations a user may employ to receive and respond to notifications. The user may begin by downloading the reminder application from an application source or via a website of the notification system 202. For example, the user may download the application from their phone's application markets, such as an Apple (iOS) and/or a Google (Android), etc., each of which maintains a centralized marketplace for downloading applications.

Using the application or through the website, the user must submit registration information. Using the application, the user may enter his or her first name, last name, email address, password and password confirmation. All five fields are generally required for registration to be completed. A confirmation email may be sent to the email address containing a link/code for verification. Once the link has been clicked or the code has been submitted via the application, the user is registered and can begin subscribing to business entities 212 that are registered with the reminder application of the notification system 202.

Once the user has established a notification application registration procedure, the user may subscribe to business entities registered with the reminder application. In order to successfully subscribe, the user must use the reminder application by scanning the business entity's QR code. The codes can be scanned anywhere, for example, from a poster, sheet of paper or via an email or website. The QR code contains information about the business entity which, along with the user's information, submits a request for a subscription to the notification engine 204. Once the user is verified by the business entity 212, via integration efforts or from manual verification procedures, the user may begin receiving push notifications based on the reminders that have been uploaded to the notifications database 206.

Using the reminder application, the user may input an alphanumeric code, which contains information about the business entity 212. The business entity 212 may submit information to setup a notification, such information may include the user's information and a request for subscription to the notification engine 204. Once the user is verified by the business entity 212 via integrations or manual verification, the user will begin receiving push notifications.

Figure 5A:
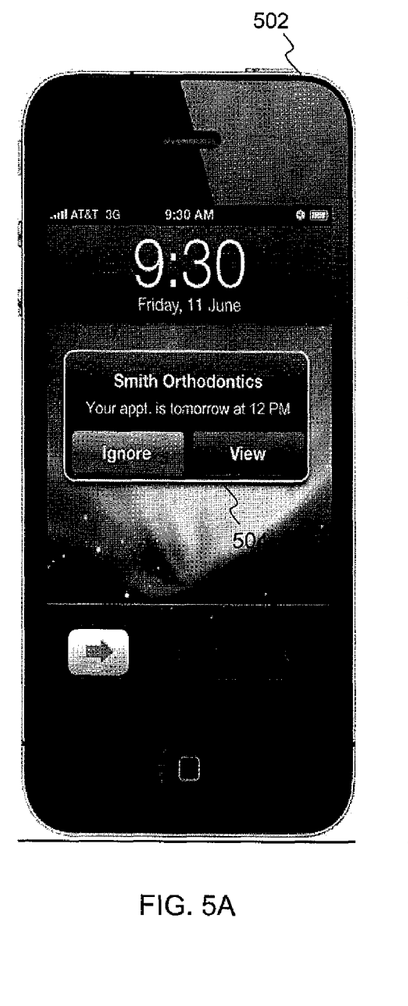
FIGS. 5A and 5B illustrate additional notification applications according to an example embodiment of the present invention.
Figure 5B:
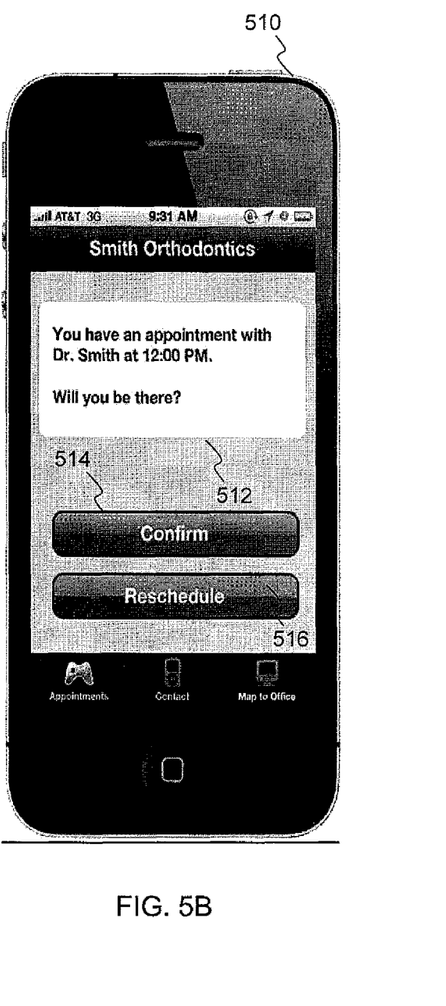

FIGS. 5A and 5B illustrate additional calendar applications according to an example embodiment of the present invention. Referring to FIG. 5A, the smartphone 502 includes a user interface with a notification reminder window 504. The user may select an option to ignore or view the appointment. FIG. 5B illustrates an example of the user selecting an option to view the appointment and select additional notification options. For example, the user may be informed of the additional details of the appointment in window 512, and may confirm the current appointment 514 or reschedule the appointment 516.

A user may optionally respond to a push notification. Once a push notification is received, the user can click on the push notification to launch the reminder application and view full details about the notification. The user response or feedback may be a simple one question survey, such as confirming an appointment so the business entity 212 can have confirmation of the appointment. The user may unsubscribe from receiving notifications from the business entity 212. If a user wishes to stop receiving push notifications, he or she can remove the business entity 212 from his or her list of subscriptions on the application. By removing the subscription, a web service request may be sent to remove the user's subscription entry from the notification database 206.

Figure 6:
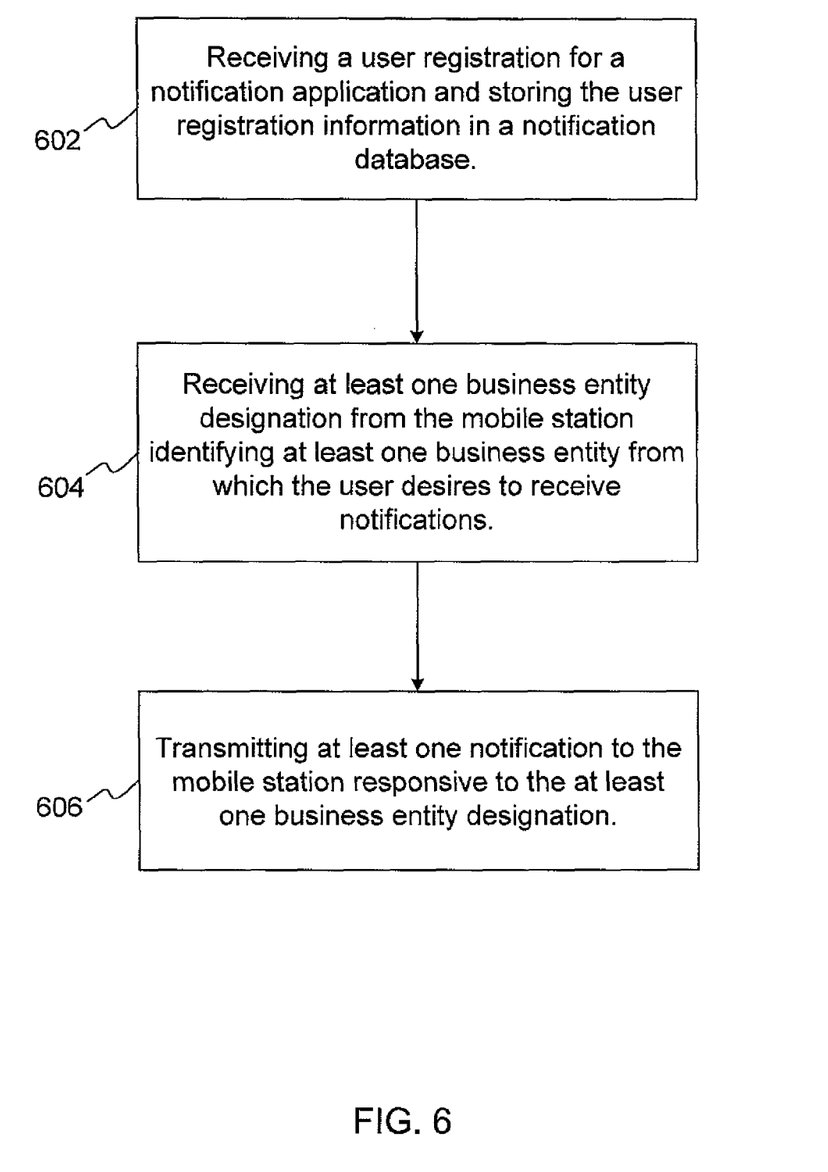
FIG. 6 illustrates a flow diagram of an example method according to example embodiments of the present invention.

FIG. 6 illustrates a flow diagram of an example method according to example embodiments of the present invention. FIG. 6 describes a method of providing notifications to a mobile station user. The method may include receiving a user registration for a notification application and storing the user registration information in a notification database, at operation 602. The method may also include receiving at least one business entity designation from the mobile station identifying at least one business entity from which the user desires to receive notifications, at operation 604. The method may further include transmitting at least one notification to the mobile station responsive to the at least one business entity designation, at operation 606.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 7 illustrates an example network element 700, which may represent any of the above-described network components of FIGS. 1 and 2.

Figure 7:
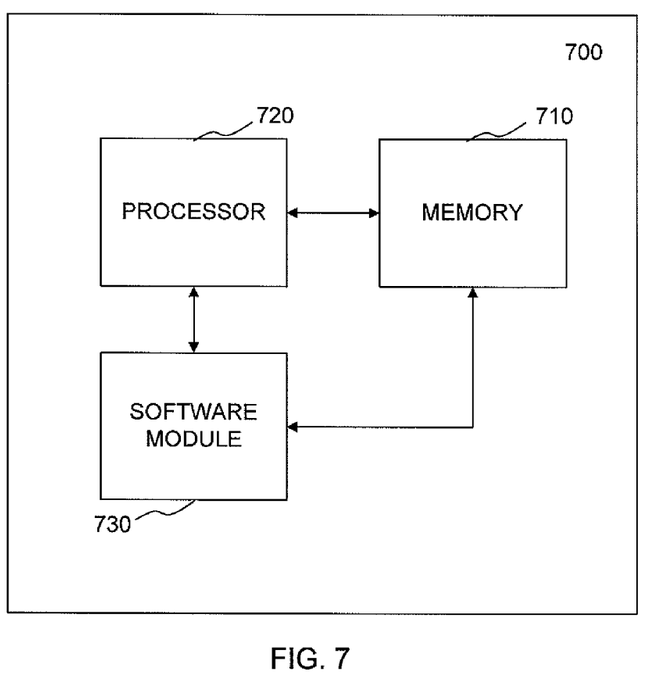
FIG. 7 illustrates a network entity that may include memory, software code and other computer processing hardware, according to example embodiments of the present invention.

As illustrated in FIG. 7, a memory 710 and a processor 720 may be discrete components of the network entity 700 that are used to execute an application or set of operations. The application may be coded in software in a computer language understood by the processor 720, and stored in a computer readable medium, such as, the memory 710. Furthermore, a software module 730 may be another discrete entity that is part of the network entity 700, and which contains software instructions that may be executed by the processor 720. In addition to the above noted components of the network entity 700, the network entity 700 may also have a transmitter and receiver pair configured to receive and transmit communication signals (not shown).

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method of providing notifications to a mobile station user, the method comprising:
   receiving a user registration for a notification application and storing the corresponding user registration information in a notification database, the user registration information comprising a quick response (QR) code scan entry identified by the mobile station and associated with at least one business entity;
   receiving at least one business entity designation from the mobile station identifying the at least one business entity from which the user desires to receive notifications, responsive to the QR code scan entry;
   linking the user registration information and the at least one business entity designation in the notification database to provide a link between notifications scheduled by the at least one business entity, and at least one notification to be sent to the mobile station;
   identifying a send window parameter comprising a window begin parameter and a window end parameter which together define a predetermined send window in the at least one notification to be transmitted to the mobile station;
   scheduling the at least one notification to be transmitted to the mobile station based on the predetermined send window; and
   transmitting the at least one notification to the mobile station during the predetermined send window responsive to the at least one business entity designation.

2. The method of claim 1, wherein the registration is performed via at least one of a website registration, a scanning operation performed via the mobile station and an alphanumeric code entered into the notification application.

3. The method of claim 2, wherein the scanning operation is performed via the mobile station scanning a quick response (QR) code.

4. The method of claim 1, wherein registration comprises receiving at least one of a user name, address, e-mail address and notification preferences.

5. The method of claim 1, further comprising:
   flagging the user as a consented notification recipient and storing the flag in the notification database.

6. The method of claim 1, further comprising:
   linking the user registration and the at least one business entity designation in the notification database prior to transmitting the at least one notification to the mobile station.

7. The method of claim 1, wherein the at least one notification is transmitted to the mobile station automatically via a push protocol.

8. An apparatus configured to provide notifications to a mobile station user, the apparatus comprising:
   a receiver configured to
      receive a user registration for a notification application and storing the corresponding user registration information in a notification database, the user registration information comprising a quick response (QR) code scan entry identified by the mobile station and associated with at least one business entity;
      receive at least one business entity designation from the mobile station identifying the at least one business entity from which the user desires to receive notifications, responsive to the QR code scan entry;

a processor and memory communicably coupled to the processor, the processor configured to
link the user registration information and the at least one business entity designation in the notification database to provide a link between notifications scheduled by the at least one business entity, and at least one notification to be sent to the mobile station;
identify a send window parameter comprising a window begin parameter and a window end parameter which together define a predetermined send window in the at least one notification to be transmitted to the mobile station;
schedule the at least one notification to be transmitted to the mobile station based on the predetermined send window; and
a transmitter configured to transmit the at least one notification to the mobile station during the predetermined send window responsive to the at least one business entity designation.

9. The apparatus of claim 8, wherein the registration is performed via at least one of a website registration, a scanning operation performed via the mobile station and an alphanumeric code entered into the notification application.

10. The apparatus of claim 9, wherein the scanning operation is performed via the mobile station scanning a quick response (QR) code.

11. The apparatus of claim 8, wherein registration comprises receiving at least one of a user name, address, e-mail address and notification preferences.

12. The apparatus of claim 8, further comprising:
a processor configured to flag the user as a consented notification recipient and store the flag in the notification database.

13. The apparatus of claim 12, further comprising:
linking, via the by processor, the user registration and the at least one business entity designation in the notification database prior to transmitting the at least one notification to the mobile station.

14. The apparatus of claim 1, wherein the at least one notification is transmitted to the mobile station via a push protocol.

15. A non-transitory computer readable storage medium comprising instructions that when executed cause a processor to perform establishing a notification distribution, the processor being further configured to perform:
receiving a user registration for a notification application and storing the corresponding user registration information in a notification database, the user registration information comprising a quick response (QR) code scan entry identified by the mobile station and associated with at least one business entity;
receiving at least one business entity designation from the mobile station identifying the at least one business entity from which the user desires to receive notifications, responsive to the QR code scan entry;
linking the user registration information and the at least one business entity designation in the notification database to provide a link between notifications scheduled by the at least one business entity, and at least one notification to be sent to the mobile station;
identifying a send window parameter comprising a window begin parameter and a window end parameter which together define a predetermined send window in the at least one notification to be transmitted to the mobile station;
scheduling the at least one notification to be transmitted to the mobile station based on the predetermined send window; and
transmitting the at least one notification to the mobile station during the predetermined send window responsive to the at least one business entity designation.

16. The non-transitory computer readable storage medium of claim 15, wherein the synchronization information includes at least one appointment scheduled for the at least one user notification recipient.

17. The non-transitory computer readable storage medium of claim 16, wherein the processor is further configured to perform:
periodically receiving messages at an application programming interface to upload at least one appointment notification scheduled for the at least one user notification recipient.

18. The non-transitory computer readable storage medium of claim 15, wherein the processor is further configured to perform:
triggering the at least one notification scheduled for the at least one user notification recipient via a notification engine; and
transmitting the at least one notification to the at least one user responsive to triggering the at least one notification.

19. The non-transitory computer readable storage medium of claim 15, wherein the processor is further configured to perform:
periodically receiving update messages at the notification database; and
creating new notification entries in the notification database responsive to receiving the update messages.

20. The non-transitory computer readable storage medium of claim 19, wherein the update messages prompt a rescheduling of existing notifications.

* * * * *